Oct. 12, 1965  J. RUDELICK  3,211,415
PILOT CONTROLLED VALVE ACTUATING MECHANISM
Original Filed Nov. 1, 1962  3 Sheets-Sheet 1

John Rudelick

Oct. 12, 1965  J. RUDELICK  3,211,415
PILOT CONTROLLED VALVE ACTUATING MECHANISM
Original Filed Nov. 1, 1962  3 Sheets-Sheet 2
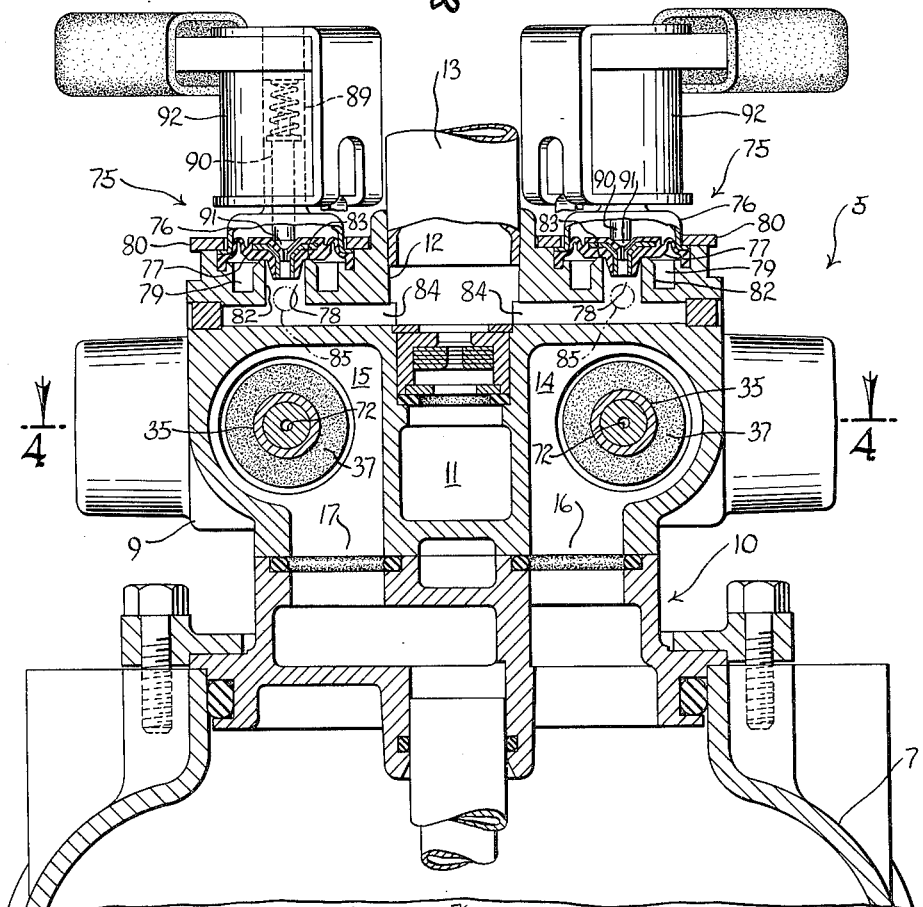
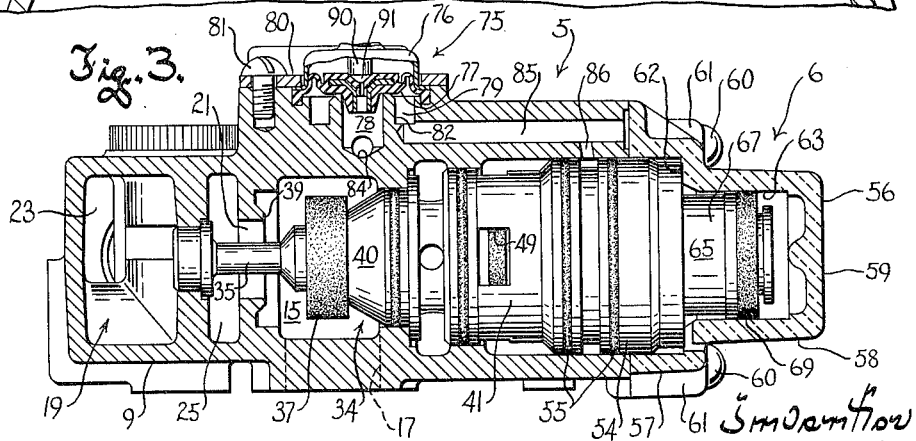

3,211,415
PILOT CONTROLLED VALVE ACTUATING MECHANISM
John Rudelick, Milwaukee, Wis., assignor to Bruner Corporation, Milwaukee, Wis., a corporation of Wisconsin
Original application Nov. 1, 1962, Ser. No. 234,669. Divided and this application Apr. 1, 1964, Ser. No. 356,517
5 Claims. (Cl. 251—33)

This invention is directed to subject matter disclosed in my copending application, Serial No. 234,669, filed November 1, 1962, of which this application is a division.

Said copending application relates to a valve structure that is ideally suited for the control of fluid flow in water treating and conditioning apparatus, and especially water softening systems. The valve structure embodies a pair of two position valve elements, and a pilot controlled hydraulic actuating device is provided for each valve element, to shift it back and forth from one operating position to the other thereof. A water softening system equipped with such a control valve, therefore, can be fully automatic in operation.

The present invention relates to the pilot controlled hydraulic actuating devices disclosed in my aforesaid copending application, and which, though especially well suited for use with fluid flow control valves of any type having a valve element that must be moved from one position to another and then returned to its original position, is generally useful as an operator capable of imparting back and forth motion to any member to be actuated.

One of the purposes of this invention is to provide a fluid pressure responsive actuating device of the character described, which can be readily incorporated in a fluid flow control valve mechanism and operated by the pressure of the fluid in the valve mechanism.

Another purpose of this invention is to provide a fluid pressure responsive actuating device of the character described which comprises a piston that is adapted to be drivingly connected to one end of a member to be actuated, a cylinder in which the piston operates, and means to deliver to and control the supply of pressure fluid from a source thereof to the opposite ends of the cylinder.

More specifically, it is a purpose of this invention to provide an actuating device such as described above, wherein the piston has opposite end surfaces of different areas and operates in a cylinder having large and small diameter ends, so that fluid at the same pressure in the opposite ends of the cylinder exerts force on the piston to move it toward and hold it in a normal position adjacent to the small diameter end of the cylinder, and wherein the piston is moved toward the large diameter end of the cylinder in consequence of venting of the latter.

In this connection, it is a further purpose of the invention to provide a hydraulic actuator of the character described, wherein pressure fluid from a common source is fed into the large diameter end of the cylinder at a substantially lower rate than such fluid is supplied to the smaller diameter end of the cylinder, and wherein a normally closed pilot valve governs venting of the large diameter end of the cylinder, so that the piston is hydraulically driven in one direction when the pilot valve is in its cylinder venting position, and is hydraulically driven in the opposite direction when the pilot valve is reclosed.

Still another purpose of this invention resides in the provision of a hydraulic actuator of the character described, wherein the small diameter end of the cylinder is at all times communicated with a source of fluid under pressure, and the large diameter end of the cylinder receives pressure fluid from the small diameter end of the cylinder through a restricted passage in the piston opening to the opposite axial ends thereof.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which:

FIGURE 2 is a cross sectional view taken through FIGURE 1 along the line 2—2, and illustrating the manner in which the control valve may be mounted on the top of a softener tank;

FIGURE 3 is a longitudinal sectional view taken on the plane of the line 3—3 in FIGURE 1.

Figure 1:
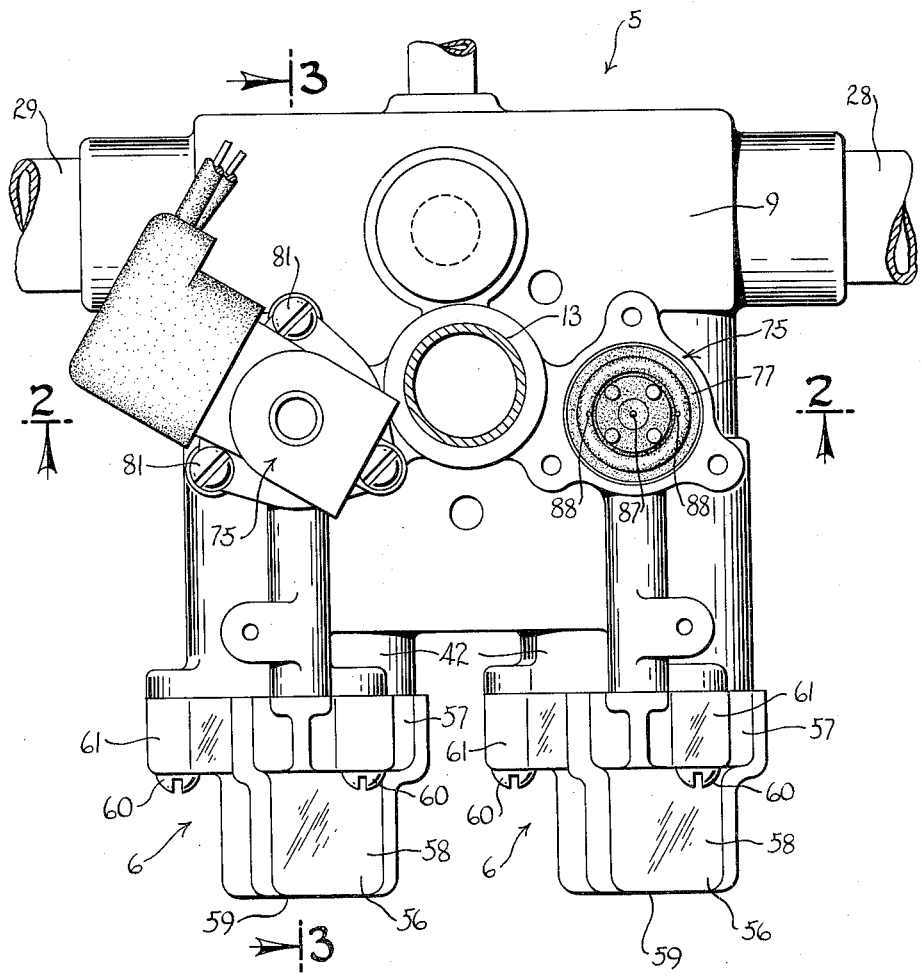
FIGURE 1 is a plan view of a water softener valve equipped with automatic valve shifting means of this invention.

Referring now more particularly to the accompanying drawings, wherein like reference characters have been applied to like parts throughout the views, the numeral 5 generally designates a control valve embodying the hydraulic actuating means 6 of this invention. FIGURE 2 illustrates how the control valve 5 may be mounted on the top of a water softening tank 7 if desired, to control the normal service flow of water downwardly through the bed of ion exchange material (not shown) in the tank and to also effect regeneration of the exchange material. During regeneration, the valve mechanism functions to educt brine from a brine tank forming part of the water softening system, and to direct such brine downwardly through the softener tank. Backwashing of the bed of ion exchange material in the softener tank may follow brining as the second step of a regenerating cycle, although it will be appreciated that the valve mechanism can effect backwashing prior to brining, if desired. Fresh hard water may be caused to flow through the water softener tank from the top thereof, as the final step of a regenerating cycle.

The control valve 5 will be only briefly described herein since its construction is fully set forth in my aforesaid copending application, Serial No. 234,669. It comprises a body casting 9 of box-like construction and substantially squat or shallow, and it can be mounted on the top of a water softener tank, as seen in FIGURE 2 by means of an adaptor generally designated 10 secured to its underside.

The valve body 9 is formed with a central chamber 11, more or less centered over the adaptor 10, and which opens upwardly to the top of the body through a drain port 12 in which a drain line 13 may be connected. At opposite sides of the chamber 11, the body 9 is formed with a pair of chambers 14 and 15 which open downwardly to the bottom of the body through main or tank ports 16 and 17, respectively. The port 16 may be referred to as a top tank port since it is adapted to be connected to the upper interior portion of a water softener tank, while the port 17 may be said to comprise a bottom tank port since it is adapted to be connected with the lower interior portion of a water softener tank.

An elongated chamber 19 is formed on the rear of the valve body and extends transversely thereacross, behind the chambers 14 and 15. The chambers 14 and 15 are communicated with the chamber 19 through substantially large diameter ports 20 and 21, respectively, in their rear walls.

The transverse chamber 19 has a partition member 22 therein which divides its interior into inlet and outlet compartments, namely an elongated inlet compartment 23 that extends along the rear wall of the chamber and opens to the right side of the body through an inlet port 24, and an elongated outlet compartment 25 that extends along the front wall of the chamber, in side-by-side relation to the inlet passage 23, and which opens to the left side of the body through a service port 26. The partition member 22, however, has an irregular shape such as to define a short inlet branch 27 into which the port 20 opens. Consequently, that portion of the outlet compartment 25 which is nearest the inlet port 24 is located more or less centrally between the inlet compartment 23 and its branch 27, and rearwardly of the chamber 14. Similarly, that portion of the inlet compartment 23 which is nearest the service port 26 is rearwardly of the chamber 15, and separated from the rear wall of the latter by a portion of the outlet compartment 25.

The port 24, of course, provides for connection of the control valve with a hard water supply line 28, while the service port 26 provides for delivery of treated or softened water to a service line 29 connected with the port 26.

The partition member 22 not only divides the interior of the chamber 19 into what might be termed overlapping transversely extending inlet and outlet compartments, but it also serves to normally prevent communication between the inlet port 24 and the service port 26. At times when the control valve is effecting regeneration of a water softener, however, provision is made to bypass fresh raw water to the service port, and for this purpose the partition member 22 is provided with a first bypass port or passage 30 therein coaxial with the port 20, to communicate the inlet branch 27 with the outlet compartment 25 at a location behind the chamber 14, and a second bypass port 31 coaxial with the port 21 to communicate the inlet compartment 23 with the outlet compartment 25 at a location behind the chamber 15. Communication between the inlet port 24 and the service port 26 through the bypass ports 30 and 31 is normally blocked by the valve mechanism within the body.

The valve mechanism comprises a pair of nearly identical valve units 33 and 34 respectively associated with the main ports 16 and 17. Each valve unit comprises an elongated stem 35, and the stems are slidably guided in transverse bearing walls 36 in the body for endwise fore and aft movement with their axes parallel and lying in a common horizontal plane. The stem of the valve unit 33 extends rearwardly from its bearing into the chamber 14 and coaxially through the port 20 into the bypass port 30. Similarly, the stem of the valve unit 34 extends rearwardly from its bearing into the chamber 15 and coaxially through the port 21 into the bypass port 31.

One of the functions of the valve unit 33 is to control communication between its main port 16 and the inlet port 24 through the internal port 20. Similarly, one of the functions of the valve unit 34 is to control communication between its main port 17 and the service port 26 through the internal port 21.

For this purpose, each of the valve stems has a resilient valve disc 37 coaxially secured thereto and movable back and forth in its associated chamber 16–17. The internal ports 20 and 21 open into their respective chambers 16 and 17 through annular forwardly facing valve seats 38 and 39, respectively, which seats may be engaged by the discs 37 to close the internal ports and define the rearward limits of motion of the valve units.

Each of the valve stems extends forwardly from the valve disc thereon, coaxially through a pair of tandem arranged annular inserts 40 and 41, which are axially slidably received in the hollow interior of the valve body for removal through tubular forward extensions 42 on the body.

The bores of the rear inserts 40 cooperate with the stems 35 of the valve units to define annular waste or drain passages 44 that communicate with the valve chambers 14 and 15, and which may be closed to block their communication with the main ports 16 and 17 by the valve discs 37 in the forward limits of motion of the valve units. For this purpose, the rear of the inserts project into the chambers 14 and 15 and are formed to provide annular rearwardly facing seats 45 and 46 respectively coaxial with and opposing the seats 38 and 39, and which define the forward limit of travel of the valve units when engaged by the valve discs 37 thereon.

For convenience, the annular seats 45 and 46 may be referred to as drain ports.

The annular drain passage 44 through the rear insert for valve unit 34 communicates more or less directly with the exhaust chamber 11 through radial apertures in the side wall of the insert that open to a lateral branch 47 of the exhaust chamber.

The adjacent portions of the inserts abut one another within a chamber 48 in the valve body, extending transversely across the front portion thereof, and the drain passages 44 of the valve units communicate with the chamber 48 through notches 49 in the rear ends of the forward inserts 41.

The main port 16 for valve unit 33 can be communicated with the drain or exhaust passage 11, through the front chamber 48, and the forward end portion of the drain passage 44 of valve unit 34, depending upon the position of the latter. A second valve element 50 mounted on and surrounding the stem of valve unit 34 is so located thereon as to enter and close the front end of its annular drain passage 44 whenever the valve unit is moved to its rearward limit of travel, seen in FIGURE 4 so as to then prevent communication between the port 16 and the drain chamber 11, but without interfering with the flow of fluid from the valve chamber 15 to the drain or exhaust chamber.

At their rear ends, the stem 35 of the valve units have enlargements that carry O-ring valve elements 52 to respectively engage in the bypass ports 30 and 31 and close the same in the normal forward positions of the valve units.

When either of the valve units is moved to its rear position for regenerating purposes, the valve elements 52 are moved rearwardly through the bypass ports 30 and 31 to open the same.

The forward annular inserts 41 have forwardly projecting cylindrical skirts 54 thereon that fit in the tubular forward extensions 42 on the body. These skirts project from the transverse bearing walls 36 on the inserts, and are formed integrally therewith, and they extend a distance beyond the front ends of the tubular extensions 42. A pair of O-rings 55, encircling each of the skirts 54 engages the inner surface of the surrounding tubular extension 42 to provide a leakproof seal therebetween.

Cup-like closure members or caps 56 are secured to the front of the valve body, over each tubular extension 42 thereof, to close off the open forward ends of the tubular extensions, and to hold the front inserts 41 against forward displacement. These caps are preferably formed of a transparent plastic material, and they have large diameter rim portions 57 which encircle the forward end portions of the skirts 54 on the forward inserts and abut the front ends of the tubular extension 42 on the body. In addition, each of the caps has a smaller diameter cylindrical body portion 58 ahead of its rim portion, which extends forwardly to the end wall 59 of the closure. A plurality of screws 60 passing through suitable apertures in ears 61 on the rim portions of the caps and threading into mating ears on the front ends of the extensions 42 detachably secure the caps in place on the front of the body.

Forward displacement of the front inserts 41 relative to the valve body is precluded by means of shoulders 62 which are formed on the caps 56 at the junctions of their large diameter rim portions with their smaller diameter body portions. These shoulders face rearwardly and are contiguous to the forward extremities of the skirts 54.

The caps 56 cooperate with the forwardly extending skirts 54 on the front inserts 41 to define cylinders, each having a small diameter forward end 63 opening to a larger diameter rear end 64. The small diameter ends of the cylinders are defined by the bodies 58 of the caps, while the larger diameter rear ends of the cylinders are defined by the cylindrical skirts 54 on the front inserts. An annular piston 65 is slidable fore and aft in each of these cylinders and the pistons are coaxially threaded onto the forward extremities of the stems 35 of the valve units as at 66. Each piston, of course, has a small diameter front portion 67 to fit the small diameter forward end of its cylinder, and a larger diameter rear portion 68 which slidably fits the larger diameter end of its cylinder.

Resiliently flexible front and rear annular seals 69 and 70 encircling the small and large diameter ends of the pistons, respectively, engage the cylinder walls to provide sliding seals that prevent flow of fluid around the exteriors of the pistons.

The cylinders and the pistons therein comprise the main components of the hydraulic actuators 6 of this invention, by which the valve units can be driven either forwardly or rearwardly to each of their operating positions to thus effect control of the flow of fluid through the various passages and ports inside the valve body.

When liquid at source water pressure is present in the large diameter ends of the cylinders, forces are exerted upon the large diameter ends of the pistons such as to move the same forwardly and thus actuate the valve units to their forward or service positions at which their valve discs 37 engage and close the rearwardly facing drain ports 45 and 46 and to also effect closure of the bypass ports 30 and 31. The valve units are normally held in these service positions by the action upon the pistons of source water under pressure in the large diameter ends of the cylinders.

If the spaces inside the larger diameter ends of the cylinders are vented, and liquid at source water pressure is present in the small diameter ends of the cylinders, forces are exerted upon the small diameter ends of the pistons to propel the same rearwardly and thus actuate the valve units to their rear limits of motion defined by the engagement of their valve discs 37 with the forwardly facing valve seats 38 and 39.

In order to provide for back and forth actuation of the pistons in their respective cylinders and consequent shifting of the valve units between their service and regenerating positions described, provision is made for introducing fluid under pressure into both ends of the cylinders and for exhausting fluid from the large diameter ends of the cylinders. While this may be accomplished by means externally of the valve body, this invention features duct means that are built into the valve body to not only enable source water from the inlet 24 to be supplied to the small diameter ends of the cylinders, but to also enable the large diameter ends of the cylinders to be vented to the exhaust chamber 11.

Source water under pressure is fed into the small diameter forward ends of both cylinders by means of axial passages 72 extending entirely through the valve stems 35 of the two-valve units and axially through the bores of the annular pistons 65 on their forward ends. Hence, when the valve units are in their service positions corresponding to the position of valve unit 33 in FIGURE 4, water under pressure may flow forwardly through the axial passage 72 in the valve unit 33 and the bore of the piston 65 thereon to the small diameter end 63 of the cylinder for valve unit 33. When both valve units are in their forward or service positions, source water flows directly into the rear of the axial passage in valve unit 34 from the inlet chamber 23. Fluid under pressure for the cylinder of valve unit 33, however, is derived from the tank port 17 of valve unit 34 and outlet chamber 25, it being understood that port 21 is open in the service position of valve unit 34. It will be appreciated, of course, that the cylinder for valve unit 33 could just as well be supplied with fluid from the inlet branch passage 27 through a radial hole (not shown) in the stem of the valve unit, located just forwardly of its bypass valve element 52.

Pressure fluid is preferably introduced into the large diameter end 64 of each cylinder from the small diameter end 63 thereof through passages 73 in the pistons, extending fore and aft therethrough, and having their forward ends substantially restricted as at 74. Consequently, the fluid in the large diameter ends 64 of the cylinders exerts a greater force upon the pistons than does fluid in the small diameter ends 63 of the cylinders, with the result that both pistons are held in their forward or service positions until such time as the larger diameter ends 64 of the cylinders are vented and fluid therein is allowed to escape to the drain chamber 11.

When that occurs, the valve units are propelled rearwardly out of their normal positions by the forces which fluid under pressure in the small diameter ends 63 of the cylinders exert upon the pistons. According to this invention, the venting of the large diameter rear end of each cylinder is controlled by a pilot valve 75. Preferably, though not necessarily, these pilot valves are electromagnetically governed diaphragm type valve mechanisms of a known type. The pilot valves 75 are mounted upon the top of the valve body at opposite sides of the drain port 12, and nearly directly over their corresponding valve chambers 14–15. As seen best in FIGURE 2, each of the pilot valve units 75 comprises a housing the bottom portion of which provides an inverted cup-like diaphragm chamber 76. The open end of the diaphragm chamber has an outwardly directed flange that is engaged over the peripheral portion of a flexible diaphragm 77 to hold the same centered over concentric inner and outer chambers 78 and 79, respectively, both of which open upwardly toward the under side of the diaphragm. A clamping ring 80 secured to the body by screws 81 (see FIGURE 1) overlies the flange on the diaphragm chamber to hold same in place on the valve body.

The chambers 78 and 79 are separated by an upstanding tubular neck 82 on the valve body, the upper extremity of which defines an annular valve seat 83. The lower end portion of the inner chamber 78 opens to the transversely extending branch 84 of a cylinder exhaust passage in the valve body, and which branch communicates at its inner end with the drain or exhaust port 12. The outer chamber 79 communicates with the forwardly extending branch 85 of the exhaust passage for the adjacent cylinder.

The forward ends of the exhaust passage branches 85 communicate with the interiors of the large diameter ends of the cylinders through substantially radially extending openings 86 in their side wall defining skirts 54. While the actual arrangement of vent passage branches 84 and 85 and the annular chambers 78 and 79 is shown in FIGURES 2 and 3, attention is directed to FIGURE 4 where these passages, the diaphragms 77, and the chambers 78 and 79 associated therewith are shown diagrammatically in a simplified form so that their functions and operation can be more easily understood.

Figure 4:
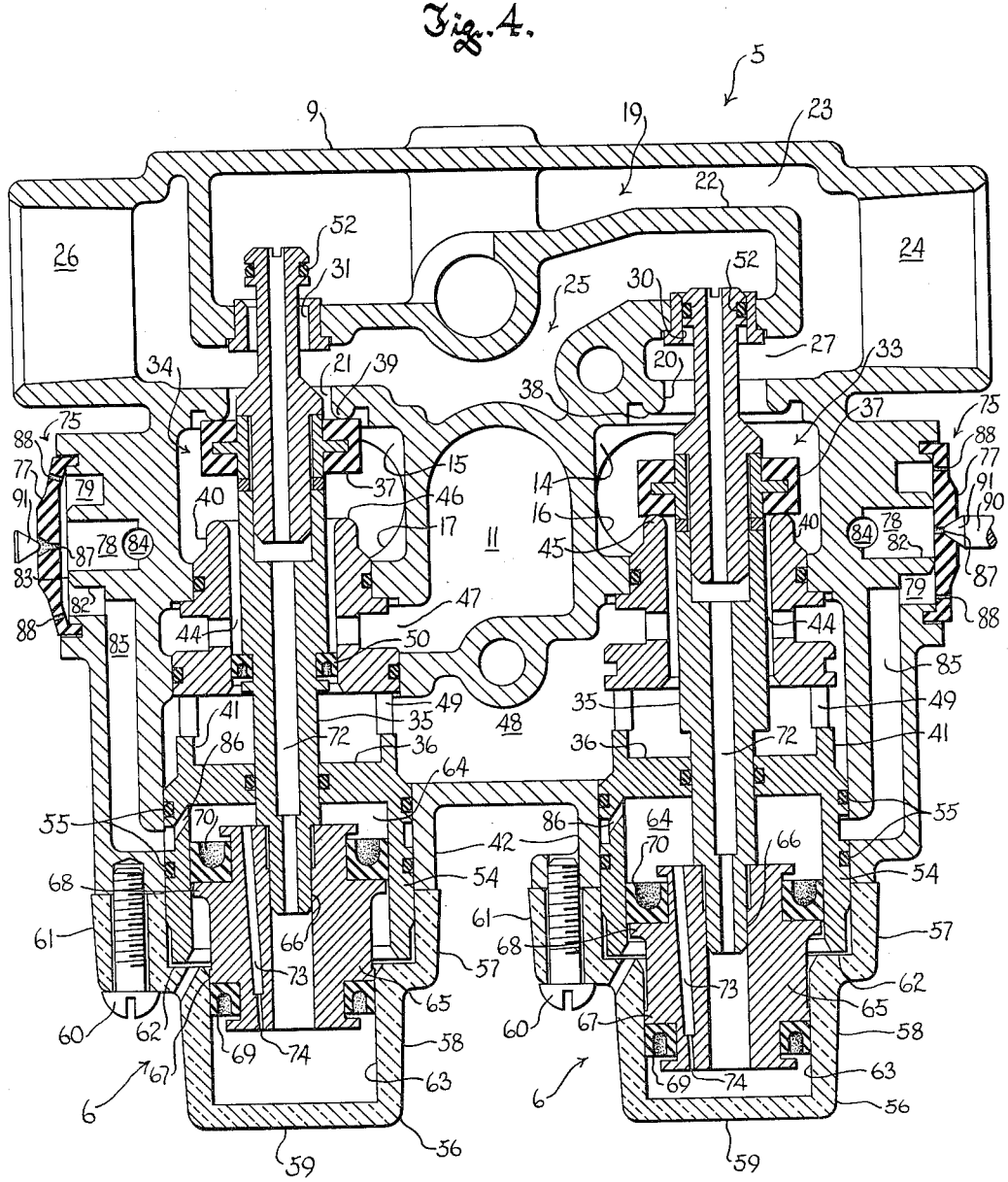
FIGURE 4 is a horizontal sectional view through the control valve, taken on the plane of the line 4—4 in FIGURE 2, and showing the two valve members of the mechanism in a regenerating position.

Thus, as diagrammatically illustrated in FIGURE 4, each of the diaphragms 77 has a small diameter central hole 87 therethrough that registers with the chamber 78 beneath it, and a plurality of even smaller diameter vents 88 that register with the outer annular chamber 79 and similarly communicate with the space inside the diaphragm housing.

As will be apparent to those familiar with the construction of the electromagnetic valve units 75, the diaphragm chamber of each is closed at its bottom by the diaphragm 77, and has a smaller diameter tubular portion 89, extending upwardly therefrom and closed at its top. An electromagnetically responsive plunger 90 slides up and down in the tubular top portion 89 of the diaphragm chamber and is normally biased downwardly by a light spring, to yieldingly hold a pointed lower extremity 91 on the plunger in the central aperture 87 in the diaphragm to close said aperture. This also causes a downward bias to be exerted on the diaphragm sufficient to hold its underside engaged with the annular seat 83 surrounding the central chamber 78, to block communication between the latter and the annular chamber 79.

This is the normal condition of each valve unit 75, at which the vent passage for its cylinder is closed and fluid under pressure is trapped in the large diameter end of its cylinder, causing the piston therein to be held in its forward position, closest to the small diameter end of the cylinder.

Upon energization of the coil 92 surrounding the upper tubular portion 89 of each of the electromagnetic units 75, the plunger 90 thereof is attracted upwardly to uncover the central aperture 87 in the diaphragm and allow fluid under pressure in the diaphragm chamber to exhaust therefrom at a rate faster than it can flow into the chamber through the small apertures 88. As a result, the pressure of fluid in the large diameter end of the cylinder and its vent passage 85 moves the diaphragm 77 upwardly off of its seat 83 to communicate the vent pasage 85 with the drain port 12.

Normally, when the diaphragm is engaged with the seat 83, fluid under pressure in the annular chamber 79 surrounding the seat 83 can flow upwardly into the diaphragm chamber through the small diameter ports 88 therein to maintain a pressure upon the top of the diaphragm that aids the plunger 90 in holding the diaphragm on its seat.

As shown in FIGURE 4, the diaphragm 77 for valve unit 34 has been lifted upwardly off of its seat 83 to vent the large diameter end of its associated cylinder. When this occurs, the pressure in the large diameter end of its cylinder is suddenly reduced to a value below that which will obtain in the small diameter end of its cylinder, due to the restriction 74 in the piston passage 73, and sufficient force is thus exerted upon the small diameter end of the piston to propel the same rearwardly and thereby cause actuation of the valve element 33 to its rear limit of motion.

The valve unit 33 will remain in this regenerating position until the coil 92 of its associated pilot valve 75 is deenergized to allow reclosure of said pilot valve. When the diaphragm 77 resumes its closed position engaging its associated seat 83, it closes the vent passage for the large diameter rear end of the cylinder for valve unit 33 and causes fluid pressure to build up therein so as to actuate its piston forwardly and carry valve unit 33 to its normal position.

It will be understood, of course, that the coils 92 of the electromagnetic pilot valves 75 can be energized or deenergized to effect actuation of the valve units 32 and 33 in any desired sequence, under the control of a calendar clock of a known type (not shown) but which may be set to periodically effect a regenerating cycle that may comprise the successive steps of brining, backwashing and flushing, followed by return of the two-valve units to their normal service positions.

One of the features of the hydraulic actuators described is that the transparent cup-like caps which define the small diameter ends of the cylinders in which the pistons operate, enable visual inspection and determination of the positions of the pistons. Hence, any malfunctioning of the actuators can be detected at a glance. When the actuators are used on the control valve of an automatically governed water softening system which requires energization and deenergization of the coils of the electromagnetic pilot valves 75 in a predetermined sequence, the positions of the pistons as seen through the transparent caps can also indicate the different regenerating steps of a regenerating cycle as well as the normal or service condition of the control valve mechanism. If it becomes apparent that the control valve mechanism is malfunctioning, the conventional external bypass valving ordinarily provided in a water softening installation can then be closed off to enable removal of the cap or caps covering the front portions of the pistons which have not operated properly. Thereafter the entire valve unit, including the inserts through which the valve stem projects, can be slid forwardly out of the valve body for service or replacement if necessary.

As stated previously, water or other fluid under pressure can be introduced into the small and large diameter ends of the cylinders in a variety of ways. For example, an external fluid line could easily be connected in a port in the end wall 59 of each of the transparent caps 56 to supply fluid directly into the small ends of the cylinders. In that case, fluid could be supplied to the large end of each cylinder through the hollow interior of its piston and a radial hole in the adjacent hollow end portion of the stem of the valve unit or other member to be actuated. It will be understood, of course, that the passage 72 in the valve stem or other member to be actuated would not then need to extend entirely through the stem, but would be in the nature of a well in the forward end portion thereof.

In any case, however, it is important that the passages through which pressure fluid is supplied to the large diameter ends of the cylinders have restrictions 74 therein small enough to assure that fluid can be exhausted therefrom faster than pressure fluid can be supplied thereto at times when the pilot valves 75 are opened. This assures the necessary pressure differential to effect rearward travel of the pistons, toward the large diameter ends of the cylinders, in response to the pressure of fluid entering the small diameter ends of the cylinders.

The arrangement of passages 73 extending fore and aft through the pistons, as shown, with the restrictions 74 opening through the front ends of the pistons to the interiors of the detachable caps 56 is advantageous since it facilitates cleaning of the restrictions in the event they become clogged by particles of foreign matter or dirt in the water or other fluid supplied under pressure to the cylinders. In addition, the arrangement shown readily enables a screen to be applied over the front ends of the pistons and the restricted passages 74 therein, with the screens detachably held in place by hollow screws threaded into the central apertures in the pistons.

From the foregoing description, together with the accompanying drawings, it will be readily apparent to those skilled in the art that this invention provides an exceptionally simple but efficient pressure responsive actuator capable of imparting back and forth motion to any member to be actuated, while being ideally suited for use with distributing valves such as are used to control fluid flow in water softener apparatus and the like.

What is claimed as my invention is:

1. In a fluid flow control valve:
   (A) a body having passage means connectable with a source of fluid under pressure, and having control passages that are communicable with said passage means;
   (B) a valve member having an elongated stem slidable endwise back and forth in the body from one operating position to another to control the transfer of fluid between said passage means and the control passages, one end of said stem extending into said passage means;
   (C) means in the body defining a cylinder having small and large diameter ends;
   (D) a piston operatively coaxially connected with the other end of the valve stem to actuate the same, said piston being movable back and forth in the cylinder and having (1) small and large diameter ends slidably fitting said small and large diameter ends of the cylinder, respectively, and (2) a small diameter passage extending therethrough to provide restricted communication between the large and small diameter ends of the cylinder;

(E) means providing a cylinder supply passage extending entirely through the valve stem and the piston to connect the small diameter end of the cylinder with said passage means so that fluid under pressure may enter and fill the small diameter end of the cylinder, and also flow through said small diameter passage in the piston into the large diameter end of the cylinder to fill the latter, whereby fluid under pressure acts upon the large diameter end of the piston with greater force than on the small diameter end of the piston, to move the piston toward and hold it in a normal position closest to the small diameter end of the cylinder;

(F) means providing an exhaust passage connecting with the large diameter end of the cylinder and through which fluid therein may be exhausted to effect actuation of the piston toward the large diameter end of the cylinder in consequence of the force exerted on the piston by fluid under pressure in the small diameter end of the cylinder;

(G) and valve means to control the flow of fluid through said exhaust passage.

2. In a fluid flow control valve:

(A) a body having passage means connectable with a source of fluid under pressure, and having control passages that are communicable with said passage means;

(B) means in the body remote from said passage means defining a cylinder having axially adjacent small and large diameter ends;

(C) a piston in said cylinder, having axially adjacent small and large diameter ends slidably fitting the corresponding ends of the cylinder, said piston having an axial hole therethrough;

(D) an elongated valve member slidable endwise in the body between first and second operating positions to control transfer of fluid between said passage means and the control passages, one end portion of the valve member projecting into said passage means, and the opposite end portion of the valve member projecting coaxially into the cylinder and being operatively connected to the piston therein;

(E) duct means communicating said passage means with the small and large diameter ends of the cylinder whereby fluid under pressure acting upon the large diameter end of the piston with greater force than on its small diameter end holds the piston shifted toward the small diameter end of the cylinder and correspondingly holds the valve member in a first operating position, said duct means including an elongated axial passage in the valve member registering at one end with said axial hole in the piston and having an inlet adjacent to the opposite end of the valve member and communicating with said passage means so that all fluid delivered to said ends of the cylinder must flow through said axial passage in the valve member;

(F) means in the body providing an exhaust passage opening from the large diameter end of the cylinder and wholly independent of said duct means, through which fluid in the large diameter end of the cylinder can be exhausted at a rate at least as fast as fluid is delivered thereto by said duct means so as to effect actuation of the piston toward the large diameter end of the cylinder in consequence of the resulting drop in pressure in the large diameter end of the cylinder and the force exerted upon the piston by fluid under pressure in the small diameter end of the cylinder;

(G) and valve means to control the flow of fluid through said exhaust passage.

3. In a fluid flow control valve:

(A) a body having fluid supply and control passages;

(B) an elongated valve member in the body having one end adjacent to the supply passage and having valve means thereon intermediate its ends, said valve member being shiftable lengthwise between first and second positions to control the transfer of fluid between said passages;

(C) cooperating wall means on the body and the valve member at the opposite end of the latter defining a first pressure chamber having a movable wall of substantially large surface area fixed to the valve member, which wall is movable to shift the valve member to said first position thereof in response to pressure of fluid in said chamber;

(D) cooperating wall means on the body and the valve member defining a second pressure chamber axially adjacent to the first and having a movable wall of substantially small surface area fixed to said opposite end of the valve member, which wall is movable to shift the valve member to said second position thereof in response to pressure of fluid in said second chamber at a value greater than obtains in said first chamber;

(E) an axial passage in the valve member through which all fluid flows to said chambers, said axial passage opening directly into said second chamber and having an inlet at the side of said valve means remote from said chambers and communicating with the supply passage;

(F) means adjacent to said opposite end of the valve member providing restricted communication between said axial passage and said first pressure chamber;

(G) and a valve controlled exhaust passage in the body entirely independent of said axial passage and opening to said first chamber through an outer wall thereof for controlling the pressure of fluid therein, said exhaust passage, when closed, maintaining fluid pressures of equal values in said chambers to cause the valve element to be held in said first position thereof by the force which pressure fluid exerts on the movable wall of said first chamber, and said exhaust passage, when open, effecting decrease in the pressure of fluid in said first chamber to a value below that obtaining in said second chamber to thereby cause the valve member to be shifted to said second position thereof.

4. Means for imparting endwise fore and aft motion to a member to be actuated, comprising:

(A) means fixed on one end portion of said member defining a piston having axially adjacent small and large diameter end portions;

(B) means defining a cylinder enclosing the piston, and from one end of which said member projects, said cylinder having small and large diameter end and large diameter end portions of the piston;

(C) duct means for concurrently supplying fluid under pressure from a common source thereof to said small and large diameter end portions of the cylinder to cause the piston to be held in a first position shifted toward the small diameter end of the cylinder due to the greater total force which fluid under pressure in the large diameter end of the cylinder exerts upon the piston, said duct means including a passage in said member extending endwise therein and through which all fluid flows to said small and large diameter end portions of the cylinder, said passage opening through the piston directly into the small diameter end portion of the cylinder and having an inlet at the opposite end portion of said member;

(D) and valve controlled exhaust passage means in the body, entirely independent of said duct means and through which fluid can be exhausted from the large diameter end portion of the cylinder faster than it can be supplied thereto from said duct means to cause the piston to be moved toward the large diameter end portion of the cylinder to a second position due to the force which pressure fluid in the small diameter end portion of the cylinder continues to exert on the piston.

5. Means for imparting endwise motion to a member to be actuated, comprising:

(A) a body into which one end portion of said member projects, and from which the member is supported for endwise motion;

(B) cooperating wall means on the body and said end portion of the member to be actuated defining a first pressure chamber having a movable wall of substantially large surface area fixed to said member, which wall is movable in response to pressure of fluid in said chamber to shift said member in one direction;

(C) cooperating wall means on the body and said end portion of the member to be actuated defining a second pressure chamber axially adjacent to the first and having a movable wall of substantially small surface area fixed to said member, which wall is movable in response to pressure of fluid in said second chamber at a value greater than obtains in said first chamber to shift said member in the opposite direction;

(D) a supply passage in said member through which all pressure fluid flows to said chambers, said supply passage opening directly into said second chamber and having an inlet remote from said chambers;

(E) duct means within the body and adjacent to said one end portion of said member, providing restricted communication between said supply passage and said first chamber;

(F) and a valve controlled exhaust passage entirely independent of said supply passage and said duct means, and opening to said first chamber through an outer wall thereof to provide for lowering the pressure of fluid therein to a value below that obtaining in said second chamber.

References Cited by the Examiner

UNITED STATES PATENTS

| | | | |
|---|---|---|---|
| 2,415,534 | 2/47 | Ries et al. | 137—559 |
| 2,615,466 | 10/52 | Garde | 251—31 X |
| 2,781,996 | 2/57 | Smallpeice | 251—43 X |
| 3,075,556 | 1/63 | Hutter et al. | 251—43 X |

M. CARY NELSON, *Primary Examiner.*

MARTIN P. SCHWADRON, *Examiner.*

UNITED STATES PATENT OFFICE
CERTIFICATE OF CORRECTION

Patent No. 3,211,415                          October 12, 1965

John Rudelick

It is hereby certified that error appears in the above numbered patent requiring correction and that the said Letters Patent should read as corrected below.

Column 10, line 61, after "end" insert -- portions respectively slidably receiving said small --.

Signed and sealed this 14th day of June 1966.

(SEAL)
Attest:

ERNEST W. SWIDER
Attesting Officer

EDWARD J. BRENNER
Commissioner of Patents